the molecular weight and the thickening efficiency of primarily oil soluble hydrocarbon polymers, such as hydrogenated random copolymers and block copolymers of styrene-isoprene or styrene-butadiene, polyisobutylene, poly-n-butene, low unsaturation butyl rubbers, low unsaturation EPDM rubbers, preferably ethylene-propylene copolymers, of the type which are to be used as viscosity index improver additives or as precursors for dispersants and multi-functional viscosity improver additives for lubricating oils, are reduced by heating and masticating the polymers in the presence of oxygen or air and in the presence of a transition metal catalyst, preferably in the further presence of a peroxide accelerator.

United States Patent [19]
Gardiner et al.

[11] Patent Number: 5,006,608
[45] Date of Patent: Apr. 9, 1991

[54] CATALYTIC PROCESS FOR OXIDATIVE, SHEAR ACCELERATED POLYMER DEGRADATION

[75] Inventors: John B. Gardiner, Mountainside; Anthony A. Loffredo, Westfield; ricardo Bloch, Scotch Plains; Nicholas C. Nahas, Chatham, all of N.J.; Keith U. Ingold, Ottawa, Canada; Theodore V. Kowalchyn, Scotch Plains, N.J.

[73] Assignee: Exxon Chemical Patents, Inc., Linden, N.J.

[21] Appl. No.: 241,620

[22] Filed: Sep. 8, 1988

[51] Int. Cl.$^5$ .................................. C08F 8/50
[52] U.S. Cl. .................. 525/370; 525/333.7; 525/333.8; 525/387
[58] Field of Search ......................... 525/370

[56] References Cited

U.S. PATENT DOCUMENTS

| | | |
|---|---|---|
| 3,013,003 | 12/1961 | Maragliano et al. |
| 3,144,436 | 8/1964 | Greene et al. |
| 3,287,342 | 11/1966 | Walton |
| 3,300,459 | 1/1967 | Natta et al. |
| 3,313,793 | 4/1967 | De Lamore |
| 3,316,177 | 4/1967 | Dorer, Jr. |
| 3,332,926 | 7/1967 | Baron, Jr. et al. |
| 3,345,352 | 10/1967 | Baron, Jr. et al. |
| 3,444,155 | 5/1969 | Fish |
| 3,551,943 | 1/1971 | Staton et al. |
| 3,563,972 | 2/1971 | Kowalski |
| 3,608,001 | 9/1971 | Kowalski et al. |
| 3,687,849 | 8/1972 | Abbott |
| 3,687,905 | 8/1972 | Dorer |
| 3,769,216 | 10/1973 | Gordon et al. |
| 4,074,033 | 2/1978 | Wolfmaki et al. |
| 4,089,794 | 5/1978 | Engel et al. |
| 4,113,636 | 9/1978 | Engel et al. |
| 4,137,185 | 1/1979 | Gardiner et al. |
| 4,201,732 | 5/1980 | Wolfmaki et al. |

FOREIGN PATENT DOCUMENTS

| | | |
|---|---|---|
| 44-15186 | 7/1969 | Japan |
| 44-29742 | 7/1969 | Japan |
| 46-32458 | 9/1971 | Japan |

*Primary Examiner*—Bernard Lipman
*Attorney, Agent, or Firm*—M. E. Alter

[57] ABSTRACT

The molecular weight and the thickening efficiency of primarily oil soluble hydrocarbon polymers, such as hydrogenated random copolymers and block copolymers of styrene-isoprene or styrene-butadiene, polyisobutylene, poly-n-butene, low unsaturation butyl rubbers, low unsaturation EPDM rubbers, preferably ethylene-propylene copolymers, of the type which are to be used as viscosity index improver additives or as precursors for dispersants and multi-functional viscosity improver additives for lubricating oils, are reduced by heating and masticating the polymers in the presence of oxygen or air and in the presence of a transition metal catalyst, preferably in the further presence of a peroxide accelerator.

10 Claims, 4 Drawing Sheets

CATALYTIC PROCESS FOR OXIDATIVE, SHEAR ACCELERATED POLYMER DEGRADATION

BACKGROUND OF THE INVENTION

1. Field of the Invention

This invention relates to a catalytic process for oxidative polymer degradation. More particularly, it is concerned with the reduction of molecular weight and the thickening efficiency of primary oil soluble hydrocarbon polymers, such as hydrogenated random copolymers and block copolymers of styrene-isoprene or styrene-butadiene, polyisobutylene, poly-n-butene, low unsaturation butyl rubber, low unsaturation ethylene-propylene-diene terpolymers (EPDM's), or ethylene-alpha-olefin copolymers, and preferably ethylene-propylene copolyemers, of the type which are to be used as viscosity index improver additives or as precursors for dispersants and multi-functional viscosity index improver additives for lubricating oil compositions.

2. Description of the Prior Art

Copolymers of ethylene and an alpha-olefin, such as a $C_3$–$C_{28}$ alpha-olefin, and particularly copolymers of ethylene and propylene, and their preparation are widely described in the art. Typical descriptions will be found, for example, in U.S. Pat. Nos. 3,300,459; 3,687,849; 3,687,905; 4,116,636; and 4,137,185.

It is known that olefin and diolefin homopolymers and ethylene-alpha-olefin copolymers may be degraded or depolymerized, thereby reducing the molecular weight thereof. Such degradation is known to be accomplished, for example, by shear assisted oxidation of the polymers and copolymers in air in a mechanical mixer, such as in extruder, masticator, Banbury mixer, rubber mill, or the like, and by heating the polymers and copolymers, sometimes in the presence of air. One such degradation process, which is described in U.S. Pat. No. 3,313,793, involves (a) the formation of a solution of a conjugated diene polymer, (b) combining therewith a peroxide and a copper source such as copper, a copper halide or a copper carboxylate, (c) heating the resulting mixture in the substantial absence of oxygen, and (d) recovering a diene polymer product having a substantially reduced average molecular weight.

U.S. Pat. No. 3,332,926 relates to the thermal degradation of polyolefins, including ethylene-propylene copolymers, to produce relatively low molecular weight polymers which are useful, for example, as wax substitutes, blending agents, coating compositions and, in general, in fields where hydrocarbon resins and waxes find utility. The process described in that patent comprises mixing a crystalline starting polymer with from 0.075% to 10% by weight of a metal salt of carboxylic acid and heating the mixture in an atmosphere which is substantially free from oxygen to a temperature of about 275° C. to 450° C., until a substantial reduction in the molecular weight of the polymer takes place.

U.S. Pat. No. 3,316,177 discloses a functional fluid containing a sludge inhibiting detergent comprising the polyamine salts of the reaction product of the maleic anhydride and an oxidized interpolymer of propylene and ethylene. The interpolymers from which the oxidized, degraded interpolymers are derived usually have molecular weights of at least about 50,000. The interpolymers are oxidized and degraded by heating them at a temperature of at least about 100° C. in the presence of oxygen or air. Such degradation usually is characterized by a substantial reduction of the molecular weight of the interpolymer.

U.S. Pat. No. 3,345,352 relates to a catalytic process for the thermal degradation of the polyolefins, including copolymers of ethylene and propylene. The degradation process involves heating a mixture of a crystalline polyolefin and an oxide or carbonate of an alkali metal, alkaline earth metal, or certain selected transition metals such as copper, iron, titanium, vanadium, etc. in an atmosphere substantially free of oxygen to a temperature of from 275° C. to 450° C. for a minimum time period of at least five minutes.

U.S. Pat. No. 3,687,849 relates to lubricants containing oil-soluble graft polymers derived from degraded ethylene-propylene interpolymers. The interpolymers from which the degraded polymers are derived usually have a molecular weight of about 50,000-800,000, and the degraded interpolymers are prepared by heating the interpolymer, or a fluid solution of such interpolymer, in an inert solvent, at a temperature of at least about 140° C. in the presence of oxygen or air. The degradation of the interpolymer is characterized by a substantial reduction of its molecular weight. A similar disclosure is set forth in U.S. Pat. No. 3,687,905.

U.S. Pat. No. 3,769,216 relates to novel polymers which are produced by reacting a primary or secondary amine and a mechanically degraded, oxidized atactic ethylene propylene copolymer, and to automotive lubricating oils containing such polymers as antivarnish additives. The ethylene propylene copolymer is mechanically degraded in the presence of oxygen and in the absence of any solvent in a closed vessel equipped with shearing blades. A typical apparatus of this type is described as a device containing counter-rotating helical blades and known as a "Brabender Torque Rheometer."

U.S. Pat. No. 4,089,794 discloses ethylene copolymers derived from about 2 to 98 wt % ethylene, and one or more $C_3$ to $C_{28}$ alpha olefins, for example ethylene-propylene, which are solution-grafted with an ethylenically unsaturated carboxylic acid material, and thereafter reacted with a polyfunctional material reactive with carboxyl groups. The resulting polymers are useful as dispersant additives for lubricating oils and hydrocarbon fuels, and as multifunctional viscosity index improvers if their molecular weight is above 10,000.

U.S. Pat. No. 4,113,636 discloses the mechanical degradation at elevated temperatures, and in the presence of air or oxygen-containing gas, of copolymers comprising about 68 to 80 mole % ethylene and one or more $C_3$–$C_8$ alpha-olefins to form an oxygenated-degraded polymer which is then reacted with an amine compound. The resulting aminated polymers are useful as viscosity index improving additives.

U.S. Pat. Nos. 4,074,033 and 4,201,732 relate to a process for improving the processability for high molecular weight neoprene polymers. The process comprises treating a solution of the polymers in an organic solvent with an organic peroxide, in the presence of oxygen, to reduce the molecular weight of the neoprene and to lower the viscosity of the solution. The process may be conducted at room temperature with or without agitation, and an accelerator such as a cobalt salt or other transition metal salt may be employed.

The above and other prior art processes thus disclose the degradation of polymers, including ethylene-propylene copolymers, which are to be used as viscosity improver additives or dispersant additives in lubricating oil compositions. However, the speed with which the prior art processes accomplish the degradation and consequent reduction of molecular weight is often sluggish, the cycle time is undesirably high, and the cost is generally high.

SUMMARY OF THE INVENTION

It is a principal object of the present invention to provide an improved polyolefin oxidative degradation procedure which is more economical than prior art procedures.

Another object is to provide a shear accelerated, catalytic, polyolefin oxidation procedure which results in a degradation of relatively higher molecular weight polymers to relatively lower molecular weight polymers at lower temperatures or in markedly shorter time periods at a given temperature, or both, thereby resulting in a savings in heat and mechanical energy requirements relative to prior art procedures.

Another object of the present invention is to be able to add more polymer to a given masticator, relative to prior art processes, during a run so as to increase the throughput of the masticator per unit of time and thereby improve process economics.

Another object is to accomplish a shear assisted oxidation of hydrocarbon soluble polymers with reduced power requirements relative to prior art processes.

Another object is to reduce the molecular weight and thickening efficiency of a hydrocarbon soluble polymer suitable for use as a viscosity index improver additives or as a precursor for a dispersant or multi-functional viscosity index improver additive to a value lower than has been possible by means of prior art shear assisted molecular weight reduction processes.

Still another object is to provide an improved process whereby a polyolefin polymer such as hydrogenated styrene-isoprene or styrene-butadiene, polyisobutylene, poly-n-butene, low unsaturation butyl rubber, low unsaturation ethylene-propylene-diene rubber, or an ethylene-alpha-olefin copolymer, such as an ethylene-propylene rubber, is more quickly broken down by a catalytic oxidative degradation using a catalyst which does not require special handling precautions to retain its catalytic activity, and which is inexpensive and readily obtained.

Yet another object is to provide an improved process for degrading ethylene-alpha-olefin copolymers by means of a catalytic, oxidative, mechanical shearing degradation process to provide reduced molecular weight polymers with functional groups such as ketone, aldehyde, carboxylic acid, hydroxy, and ester functional groups, which polymers find use as dispersant additives in lubricating oil and hydrocarbon fuel compositions and as viscosity improver additives in lubricating oil compositions.

Other objects and advantages of the present invention will be apparent from the following detailed description thereof.

DETAILED DESCRIPTION OF THE INVENTION

In accordance with one aspect of this invention, a hydrocarbon polymer, preferably an oil soluble olefin polymer or copolymer, having a number average molecular weight ($M_n$) of at least about 10,000, is heated and mixed/sheared or masticated in the presence of a catalyst, hereinafter defined, and in the presence of oxygen, oxygen-containing gas, peroxide, or hydroperoxide, at a polymer temperature of from about 100° C. to about 250° C. or higher, preferably from about 110° C. to about 210° C., so as to degrade the polymer and to thereby reduce its number average molecular weight and thickening efficiency.

The hydrocarbon polymer which is to be degraded in accordance with the present invention may comprise, for example, a copolymer of ethylene and a $C_3$–$C_{28}$ alpha-olefin having a number average molecular weight of at least about 10,000 and a thickening efficiency (T.E.) as hereinafter defined, of at least about 0.6. Alternatively, the hydrocarbon polymer may comprise poly-n-butene or polyisobutylene having a T.E. of at least about 0.6. Still other polymers which may be degraded in accordance with this invention include, for example, hydrogenated random, block or star copolymers of styrene and isoprene having a T.E. of at least about 0.6, low unsaturation butyl rubbers or low unsaturation EPDM's having a T.E. of at least about 0.6, and hydrogenated random or block copolymers of styrene and butadiene having a T.E. of at least about 0.6. Mixtures of the above and other similarly degradable substantially oil soluble polymers may also be used. As used herein low unsaturation butyl rubber is meant to include rubbers having a degree of unsaturation of no greater than about 1.7% by weight, based on the weight of diene moieties in the rubber. Similarly, the term low unsaturation EPDM's is meant to describe terpolymer rubbers having a degree of unsaturation of no greater than about 1% by weight of diene moieties in the rubbers.

The hydrocarbon polymers to be degraded in accordance with the invention preferably are oil soluble or at least dissolvable in oil with the aid of a suitable solvent, or are stably dispersible in oil. Oil soluble, dissolvable, or stably dispersible, as that terminology is used herein, does not necessarily indicate that the materials are soluble, dissolvable, miscible, or capable or being suspended in oil in all proportions. It does mean, however, that the respective polymers are soluble or stably dispersible in oil to an extent that the degraded polymers are suitable for use as viscosity index improver additives or as precursors for dispersant and multi-functional viscosity index improver additives in lubricating oil compositions.

The period of time that is required to achieve the desired reduction in molecular weight and thickening efficiency will vary depending upon the temperature, RPM and horsepower of the mixer, catalyst, and the amount of catalyst and accelerator used. However, a time period of about 2 minutes to about 6 hours normally is adequate depending upon the degree to which it is desired to reduce the T.E. and molecular weight. A time of about 30 minutes to about 3 hours usually is sufficient in a masticator to reduce the T.E. However, in an extruder, the time and residence time required are much shorter due to the higher temperatures and screw RPMs used to produce the desired shear accelerated degradation of the hydrocarbon polymer being degraded.

The oxidation can be readily stopped within a few minutes by blanketing the mixer with nitrogen and flushing out the oxygen or oxygen containing gas. This provides control for the reaction. While some oxidation continues and some residual T.E. and molecular weight loss occurs beyond the end of the reaction, this is usually due to thermal breakdown of existing hydroperoxy groups on the polymer due to previous oxidation.

In another aspect of this invention, an organic peroxide, such as ditertiary butyl peroxide, dicumyl peroxide, 2,5-dimethyl-2,5-di-t-butylperoxy hexyne-3, 2,5-dimethyl-2,5-di-t-butylperoxy hexane or the like, or mixtures thereof, other peroxides or hydroperoxides that decompose readily at a temperature above the initial mixing temperature of the polymers to be degraded in the mixer, such as above 100° C., would be added to the admixture of the copolymer, catalyst and oxygen or oxygen-containing gas to even further accelerate the polymer breakdown and reduction in molecular weight.

The ethylene copolymers to be catalytically, oxidatively, mechanically degraded in accordance with this invention contain from about 35 to about 75, preferably 40 to 70 wt. % of ethylene, and about 25 to about 65, preferably 30 to 60 wt. % of one or more $C_3$ to $C_{28}$, preferably $C_3$ to $C_8$, alpha-olefins. Such copolymers preferably have a degree of crystallinity of less than about 25 wt. %, as determined by X-ray and differential scanning calorimetry, and a number average molecular weight ($M_n$) in the range of from about 10,000 to about 500,000, preferably 60,000 to about 250,000 as determined by vapor phase osmometry (VPO), or membrane osmometry.

Copolymers of ethylene and propylene are most preferred. Other alpha-olefins suitable in place of propylene to form the copolymers or to be used in combination with ethylene and propylene to from a terpolymer include 1-butene, 1-pentene, 1-hexene, 1-octene; also branched chain alpha-olefins, such as 5-methylpentene-1 and 6-methylheptene-1 and mixtures thereof, can be used. It is preferred that the copolymers and/or terpolymers be substantially free from any diolefin materials, i.e. contain less than about 1% by weight of any diene monomer material.

The ethylene copolymers, this term including terpolymers, may be prepared using the well-known Ziegler-Natta catalyst compositions as described, for example, in U.S. Pat. Nos. 3,300,459, 3,551,336, 3,389,087, Canadian Patent No. 718,417 and U.K. Patent No. 1,397,994, the disclosures of which are incorporated herein by reference.

For example, such polymerization may be effected to produce the ethylene copolymers by passing 0.1 to 15, for example, 5 parts of ethylene; 0.05 to 10, for example, 2.5 parts of the higher alpha-olefin, typically propylene; and from 10 to 10,000 parts of hydrogen per million parts of ethylene; into 100 parts of inert solvent containing (a) from about 0.0017 to 0.017, for example, 0.0086 parts of transition metal principal catalyst, for example, $VOCl_3$; and (b) from about 0.0084 to 0.084, for example, 0.042 parts of a cocatalyst, e.g., $(C_2H_5)_3Al_2Cl_3$; at a temperature of about 25° C. and a pressure of about 60 psig. for a period of time sufficient to effect optimum conversion, for example, 15 minutes to 1½hour.

Polybutenes such as Exxon Chemical Company Vistanex of high molecular weight can be used as well as butyl rubbers of low unsaturation such as Exxon Chemical Company produced Butyl 278 with an unsaturation level of about 1.68 wt.%. Styrene-isoprene copolymers either random, block or star configuration produced by Shell Chemical Company for use as viscosity modifiers that have been hydrogenated can be used in this application. Random styrene-butadiene polymers that have been hydrogenated can also be used.

The foregoing are non limiting examples of the polymers to be used in this invention. In addition two or more polymers can be used together during this breakdown.

The polymers, which are to be degraded in accordance with this invention should be free of any substantial amount of free radical inhibitors or antioxidants, which have been found to interfere with the process. Accordingly it is preferably for the polymer to be degraded to be substantially free from materials such as hindered phenols, aromatic amines, quinones, or sulfur containing or nitrogen containing, antioxidants, or other antioxidants used to stabilize polymers against oxidation. Substantially free, in this context, is meant to be less than 0.05 wt. % of antioxidant, preferably less than 0.01 wt. %, and most preferred less than 0.001 wt. %.

Employing the catalytic, oxidative, shear accelerated degradation process of the present invention, desired lower molecular weight copolymers can be obtained either at appreciably lower temperatures or by heating for markedly shorter periods of time, as compared with oxidative, mechanical degradation procedures conducted in the absence of the present accelerator and/or catalyst.

The heating of the copolymer and catalyst mixture can be carried out in a mechanical mixer, such as extruder, masticator, Banbury mixer, rubber mill, etc. in the presence of oxygen or an oxygen-containing gas such as air, and in the substantial absence of any solvent or diluent oil; however, small amounts of oil can be present as a "heel" from the previous mastication or breakdown and small amounts of oil or other solvents, such as polyisobutylene, kerosene, etc., can be used to dilute the catalyst and/or accelerator for ease of addition.

When a gas is used such as oxygen or air it is advisable to use a large volume per unit time to keep any low molecular weight species from the polymer oxidation below the flammable or explosive limits. A change of gas every 0.5 min. is usually sufficient, as the production of these species is at the same low rate as the oxidation of the polymer itself.

Alternatively, or additionally, the oxygen source may be a non-gaseous material such as a peroxide, placed in the mechanical mixer along with the copolymer and catalyst. It is preferred, that a gaseous source of oxygen be used even when a peroxide such as ditertiary butyl peroxide is used as an oxidation accelerator.

The catalyst used can be one or a mixture of metals or metal salts or complexes, such as copper, vanadium, chromium, manganese, nickel, iron, cobalt, and/or molybdenum and their salts and complexes. In the preferred aspects of this invention, oil soluble catalysts are used. Moreover, it has been found that cobalt and/or molybdenum, and their oil soluble salts and complexes such as oleates, naphthenates, octoates, stearates and other long chain, oil soluble, organic acid salts are preferred. Long chain alkylbenzene sulfonic acid and alkyl phosphonic acid salts are also useful.

Non-limiting examples of catalysts which may be used in accordance with this invention include iron, ferrocene, ferric naphthenate, copper, copper oleate, copper naphthenate, cobalt, cobalt naphthenate or oleate, nickel, nickel naphthenate or oleate, iron oleate, vanadium, vanadium naphthenate or oleate, chromium, chromium naphthenate or oleate and manganese, manganese naphthenate or oleate molybdenum, molydenum naphthenate or oleate. Sulfonates of the above metals with $C_{18}$-$C_{24}$ alkyl benzene sulfonic acids or phosphonates of $C_{10}$-$C_{16}$ alkyl phosphonic acid can be employed.

Except when a copper containing catalyst is employed, the catalyst may be used in amounts ranging from about 1 to about 900, preferably 1 to about 60, and most preferably from about 5 to about 20 parts per million based on the amount of copolymer present in the copolymer/catalyst mixture. When a copper containing catalyst is employed, an amount of from about 1 to about 25, preferably 5 to about 25, and most preferably from about 5 to about 20 parts per million of catalyst is used.

Although it is preferred that an outside source of gaseous oxygen be provided to the copolymer/catalyst mixture, this is not absolutely necessary; the ethylene-alpha-olefin copolymer generally contains enough entrapped air to effect a significant degree of oxidation during the mechanical shear accelerated degradation. When the usual outside source is used, however, the gas may be supplied to the shearing cavity of the mechanical mixer in any convenient manner and in any convenient flow rate. Normally, air or oxygen is provided at a rate sufficient so that the amount of air or oxygen in the shearing cavity does not limit the rate of oxidation. The air or oxygen in the mixer generally should be exchanged from about once every 10 seconds to about once every 5 minutes, preferably once about every 30 seconds to about once every 2 minutes. As indicated above, the copolymer/catalyst mixture is heated during the degradation process. Accordingly, suitable means should be provided for maintaining the shearing cavity at an elevated temperature. This may be accomplished, for example, by heating the exterior of the mixer with steam or with coils filled with hot heat transfer fluid and by insulating the outside of the mixer to prevent loss of heat during mixing. Heat is generated by the mixing and breakdown process from heat of mechanical mixing/shearing and reaction. The initial mixer temperature can be from about from room temperature to about 250° C., and preferably is from about 100° C. to about 200° C. before the addition of the polymer to be degraded. The metal catalysts and the accelerators work best at polymer temperatures below about 210° C., and preferably below about 160° C. It should be recognized that the polymer temperature varies during the course of the mastication/reaction, for example, due to heat of mixing and contact with the hot masticator.

The catalyst and accelerator are added either to the polymer to be degraded before mixing occurs, for example, during the manufacture or in a finishing extruder or mill, or as soon as the polymer becomes soft enough to start to mix and band well on the blades of the mixer.

The reduction in the molecular weight of the ethylene copolymer can be determined by measuring the thickening efficiency (T.E.) of both the starting copolymer and the degraded copolymer. The thickening efficiency is defined as 2 divided by the number of grams of a polymer dissolved in a 100 gram blend of said polymer in a test oil, which is a solvent extracted neutral mineral lubricating oil having a viscosity of 6.04 CST at 100° C., a viscosity index of 105 and an ASTM pour point of $-25°$ F., which will give a viscosity of 12.08 CST at 100° C. The thickening efficiency is related to the number average molecular weight and is a much more convenient, practical measurement. As a rough guide, a T.E. of 0.6 for an ethylene-propylene copolymer corresponds to an average number molecular weight of about 10,000, a T.E. of about 1.4 corresponds to a number average molecular weight of about 30,000, and a T.E. of 2.86 corresponds to a number average molecular weight of about 80,000; polymer type influences this relationship. In accordance with the present invention, a starting copolymer having a T.E. in excess about 0.6, for example, 2.7, can be degraded to a polymer having a T.E. of less than the T.E. of the initial polymer. For example, a final T.E. of less than about 1.0, and generally less than about 0.9, can be achieved.

This invention will be further understood by reference to the following illustrative examples, wherein all parts are parts by weight and all molecular weights are number average molecular weights unless otherwise noted. The examples include preferred but non-limitive embodiments of the invention.

EXAMPLE 1

Four pounds of an ethylene-propylene rubber with an ethylene content of about 44 wt. % with no antioxidant or free radical inhibitor present and with a T.E. of 2.7 (Mn of about 80,000) was made by the Ziegler-Natta process using hydrogen moderated $VOCl_3$/ethyl aluminum sesquichloride catalyst. This polymer was added to a 2.5 gallon Bramley-Beken type masticator that had a Dowtherm jacket which was set at 150° C. and had an insulated exterior. The masticator had two blades one of which rotated at approximately twice the speed of the other causing shear of the rubber. The variable speed mixer was set initially on a low dial speed of about 2, or 26 rpm., during the addition of pieces of the polymer. When the polymer appeared to be mixing, a sample was taken, and 3.63 grams of ferrocene (590 PPM of iron on polymer) were sprinkled parallel to the blades. The speed was increased to 8-9 on the dial. Samples were taken at 15 minutes and then every 20 minutes for about 3 hours. At that time 10 lbs. of S100N-LP diluent oil was added to dissolve the polymer and remove it from the masticator. The T.E. of the samples removed was measured by viscosity in a test oil. The results are plotted in FIG. 1 and listed in Table 1.

TABLE 1

Figure 1:
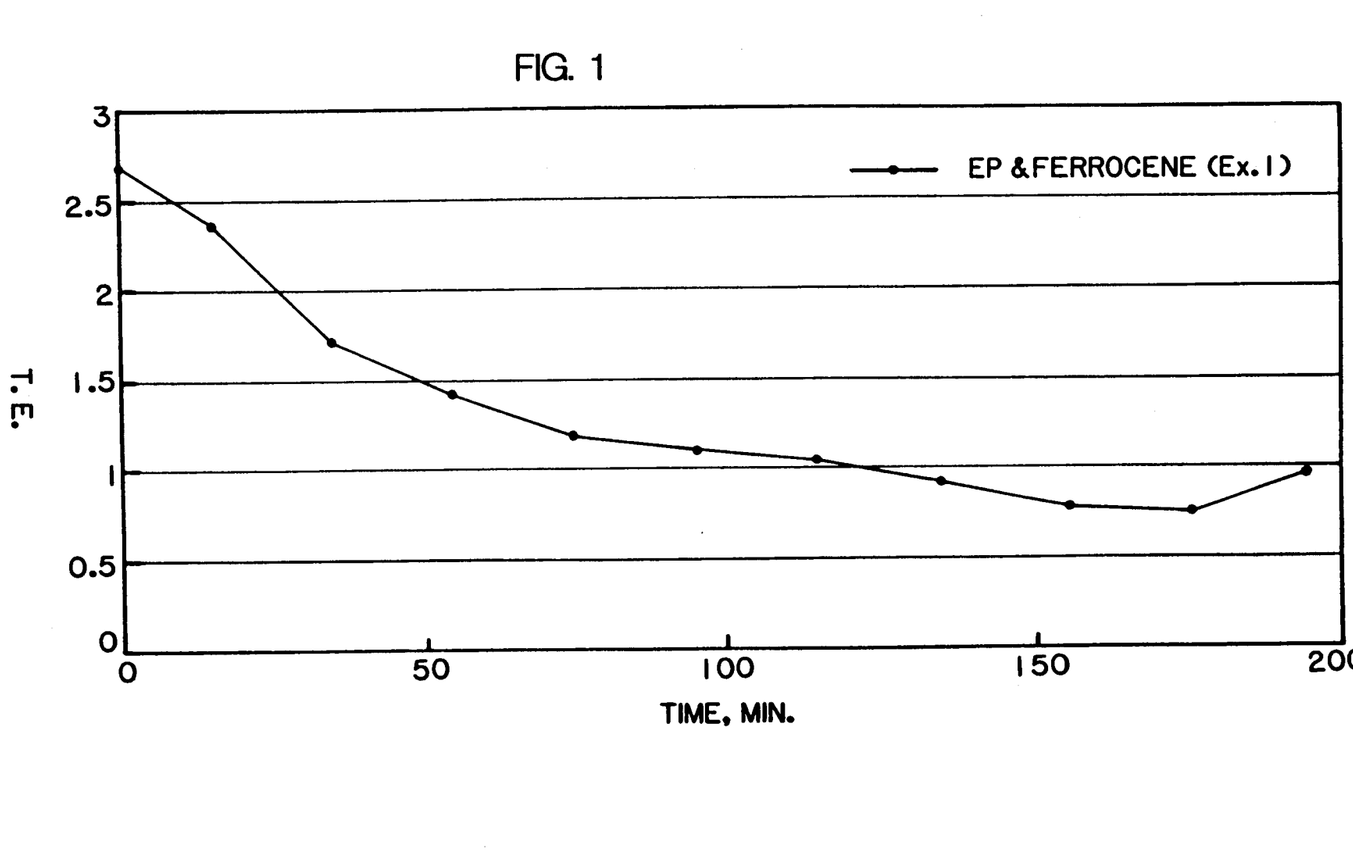
FIG. 1 is a graphical representation of the thickening efficiency (T.E.) of an ethylene-propylene copolymer versus the time, in minutes, during which a mixture of the copolymer and a ferrocene catalyst was heated and masticated in the presence of air.

| Time of Sample (minutes) | T.E. (copolymer and ferrocene) Example 1 |
| --- | --- |
| 0 | 2.7 |
| 15 | 2.37 |
| 35 | 1.17 |
| 55 | 1.41 |
| 75 | 1.17 |
| 95 | 1.09 |
| 115 | 1.03 |
| 135 | .90 |
| 155 | 0.76 |
| 175 | 0.72 |
| 195 | 0.95 |

As can be seen, the T.E. drops off rapidly for a sample of rubber with the ferrocent catalyst (Example 1).

EXAMPLE 2

The procedure of Example 1 was repeated, except that instead of the polymer used in Example 1, a polymer with essentially the same characteristics except a lower T.E. of 2.07 was employed. In addition, copper oleate (instead of ferrocene) was added at 0.7 gms. (15.4 PPM of copper on polymer) mixed with 15 ml. of S100N-LP oil poured along the blades of the masticator. The data is set forth in Table 2 and FIG. 2.

Example 3

The procedure of Example 2 was repeated, except that no catalyst or accelerator was added. The data is given in Table 2 and FIG. 2.

EXAMPLE 4

The procedure of Example 2 was repeated, except that in addition to the copper oleate, an accelerator (i.e., di-tertiary butyl peroxide) was added at a 0.5 gms. level (0.0275 wt. % on polymer) mixed with 18 gms. of S100N-LP oil over 20 minutes. The data is set forth in Table 2 and FIG. 2.

TABLE 2

Figure 2:
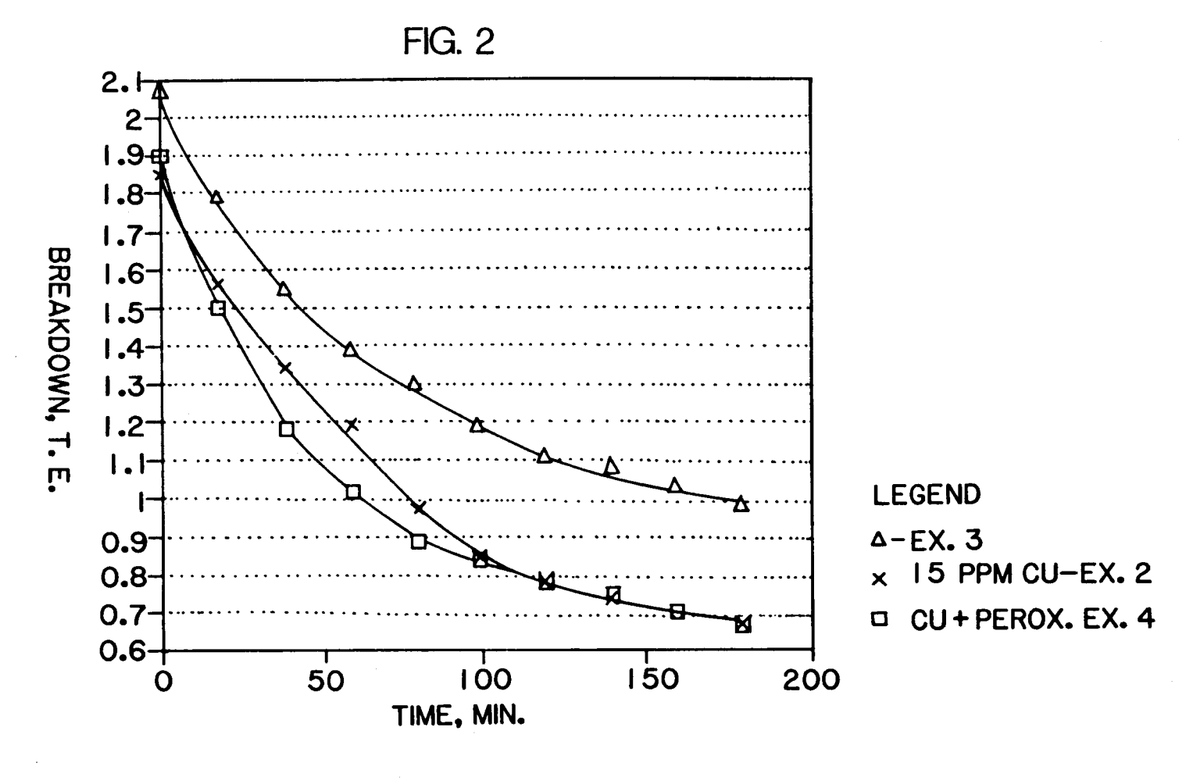
FIG. 2 is a graphical representation similar to that of FIG. 1, illustrating the T.E. versus time of heating and mastication in the presence of air of an ethylene-propylene copolymer, a mixture of the copolymer and a copper oleate catalyst, and mixture of the copolymer, a copper oleate catalyst and an organic peroxide accelerator.

| Time of Sample (Minutes) | T.E. (copolymer) Example 3 | T.E. (copolymer & copper) Example 2 | T.E. (copolymer and copper and peroxide) Example 4 |
| --- | --- | --- | --- |
| 0 | 2.07 | 1.85 | 1.90 |
| 20 | 1.79 | 1.56 | 1.50 |
| 40 | 1.55 | 1.34 | 1.19 |
| 60 | 1.39 | 1.20 | 1.02 |
| 80 | 1.30 | 0.97 | 0.89 |
| 100 | 1.19 | 0.85 | 0.84 |
| 120 | 1.11 | 0.80 | 0.80 |
| 140 | 1.08 | 0.75 | 0.75 |
| 160 | 1.03 | 0.70 | 0.70 |
| 180 | 0.98 | 0.67 | 0.67 |

EXAMPLE 5

In this example a 50 gallon Beken masticator was used. The two blades ran at 36 and 72 RPM in high gear speed and 18 and 36 RPM in low speed. During the runs the gear speed was initially low but was changed to high when the torque on the masticator was reduced enough by oxidative reduction of the viscosity of the polymer to allow this without damage to the masticator. The time at which this could be done varied depending upon the speed at which the polymer broke down. Since the oxidation was shear assisted, it was advantageous to make the shift as early as possible to keep the process cycle time to a minimum.

Temperature was measured at 5 locations by different means. One thermocouple was inserted in a side panel; one optical fiber infrared Vanzetti temperature probe was located in the rear bottom of the masticator, one in the masticator side, and another in the front of the masticator. In addition, a hand held thermocouple probe was inserted through the hatch into the rubber from time to time for a direct measurement.

The power drawn by the masticator at constant RPM was measured by a watt meter hooked up to the motor of the masticator. In the low temperature runs with an air temperature of about 180° F., the gear change from first to second was made at an average of 24 on the watt meter; and in the higher temperature runs made with the air temperature of about 286° F., the gear change was made at an average of 16 on the watt meter.

The air flow was at 13.6 SCFM at 30% flow rate and 20.4 SCFM at 45% flow rate. Two bales of rubber amounting to 150 pounds of rubber were charged as "arm sized" pieces at the start of a run. Cobalt naphthenate containing 6 wt. % cobalt was used.

An ethylene-propylene rubber having an average ethylene level of about 43 wt. % and a T.E. of 2.84 was used. The ethylene-propylene rubber did not contain any antioxidant. The diluent for the catalyst and accelerator was Exxon Chemical Parapol 700, a low molecular weight polyisobutylene.

In this example, the Dowtherm jacket was set at 400° F. and the run was started when the air temperature inside the masticator, when measured by the side thermocouple, reached 180° F. The Air Flow was at 30%. The rubber was added and mixed in low gear for 35 minutes at which point 1 lb. of Parapol 700 was added over 9 minutes. The run proceeded for 65 minutes at which time the gears were changed to high. The run was continued for 225 minutes with samples taken about every 20 minutes for T.E. measurement. The data is set forth in FIG. 3 and Table 3.

EXAMPLE 6

This example was run in the same manner as Example 5 with the following exceptions: Cobalt naphthenate was added with the Parapol at 40 PPM cobalt on rubber. The gears were changed at 60 minutes. The data is given in FIG. 3 and Table 3.

TABLE 3

Figure 3:
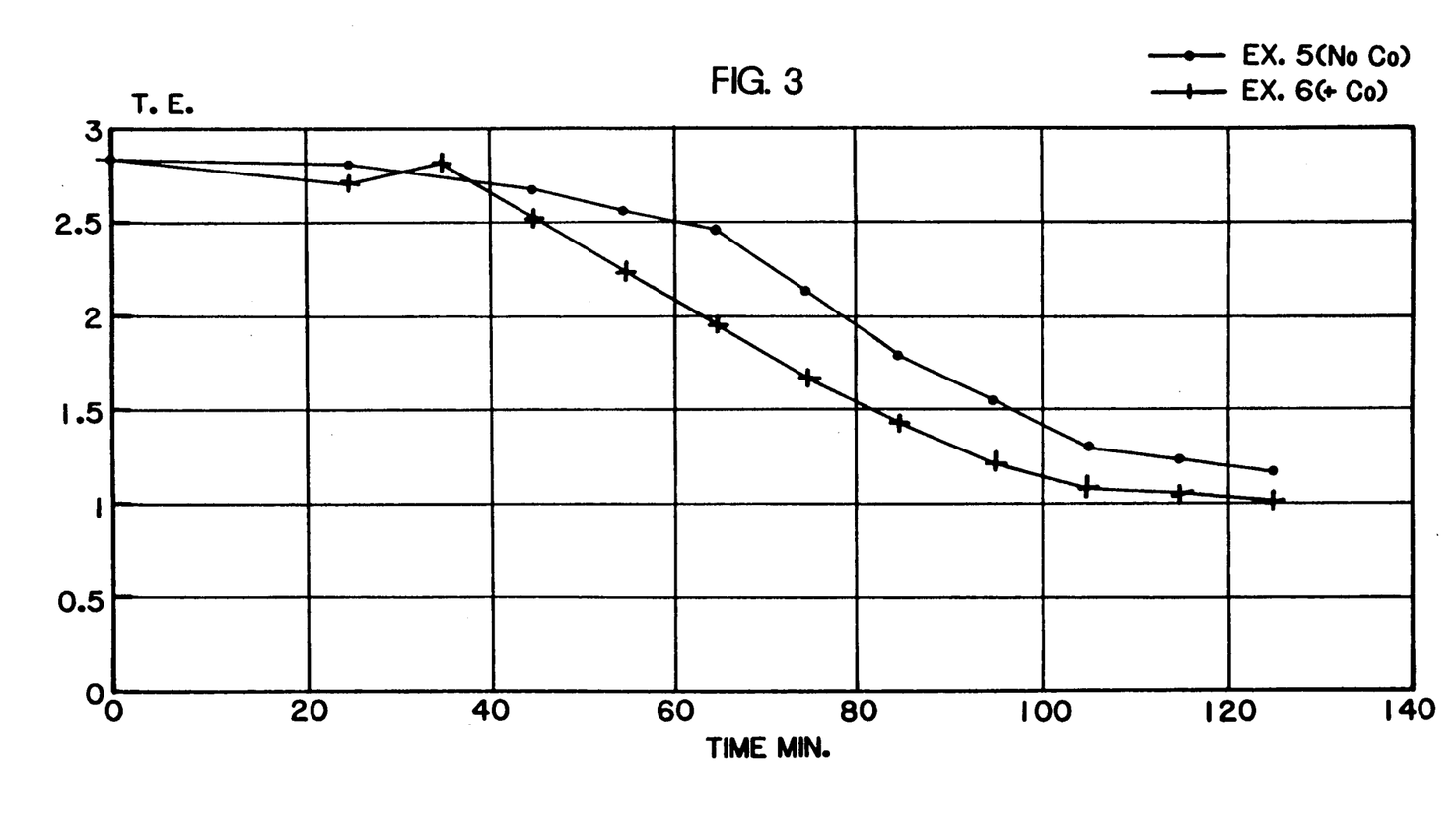
FIG. 3 is a graphical representation illustrating the T.E. versus time of heating and mastication in the presence of air, with the masticator internal air at a lower temperature of 180°–184° F. initially, of an ethylene-propylene copolymer and a mixture of the copolymer and a cobalt naphthenate catalyst.

| Time of Sample (minutes) | T.E. (Copolymer) Example 5 | T.E. (Copolymer & Cobalt) Example 6 |
| --- | --- | --- |
| 0 | 2.84 | 2.84 |
| 25 | 2.84 | 2.70 |
| 35 | 2.74 | 2.84 |
| 45 | 2.68 | 2.55 |
| 55 | 2.55 | 2.23 |
| 65 | 2.46 | 1.92 |
| 75 | 2.18 | 1.58 |
| 85 | 1.79 | 1.43 |
| 95 | 1.55 | 1.22 |
| 105 | 1.30 | 1.10 |
| 115 | 1.24 | 1.07 |
| 125 | 1.20 | 1.01 |

EXAMPLE 7

This example was run in the same manner as Example 5 with the following exceptions: The rubber used was an ethylene propylene rubber having an average ethylene lever of 47.3 wt. % and a T.E. of 0.8. The temperature inside the masticator was higher, about 268° F., due to higher jacket Dowtherm temperature of 450° F. set point. The parapol was added earlier, at 25 minutes, since the rubber banded and mixed quicker due to the higher temperature. The Parapol was added over 10 minutes and the gears were changed at 50 minutes. Overall, the breakdown was quicker than the comparable run at lower temperature (Example 5). The power requirements for this example were determined by integrating a power curve of kilowatts versus minutes from the start of the example to the time when the instantaneous power consumption returned to the value characteristic of the instantaneous power requirement for the empty masticator at the start of the example. The power requirement for this example was determined to be 32.77 kilowatt hours. The data for this example is given in Table 4 and FIG. 4.

EXAMPLE 8

This example was run in the same manner as Example 7 with the following exceptions: cobalt naphthenate (20 PPM cobalt on rubber) were added dissolved in Parapol, and the gear change was made at 45 minutes. The power requirement for this example was determined to be 27.26 kilowatt hours. The data for this example is set forth in Table 4 and FIG. 4.

TABLE 4

Figure 4:
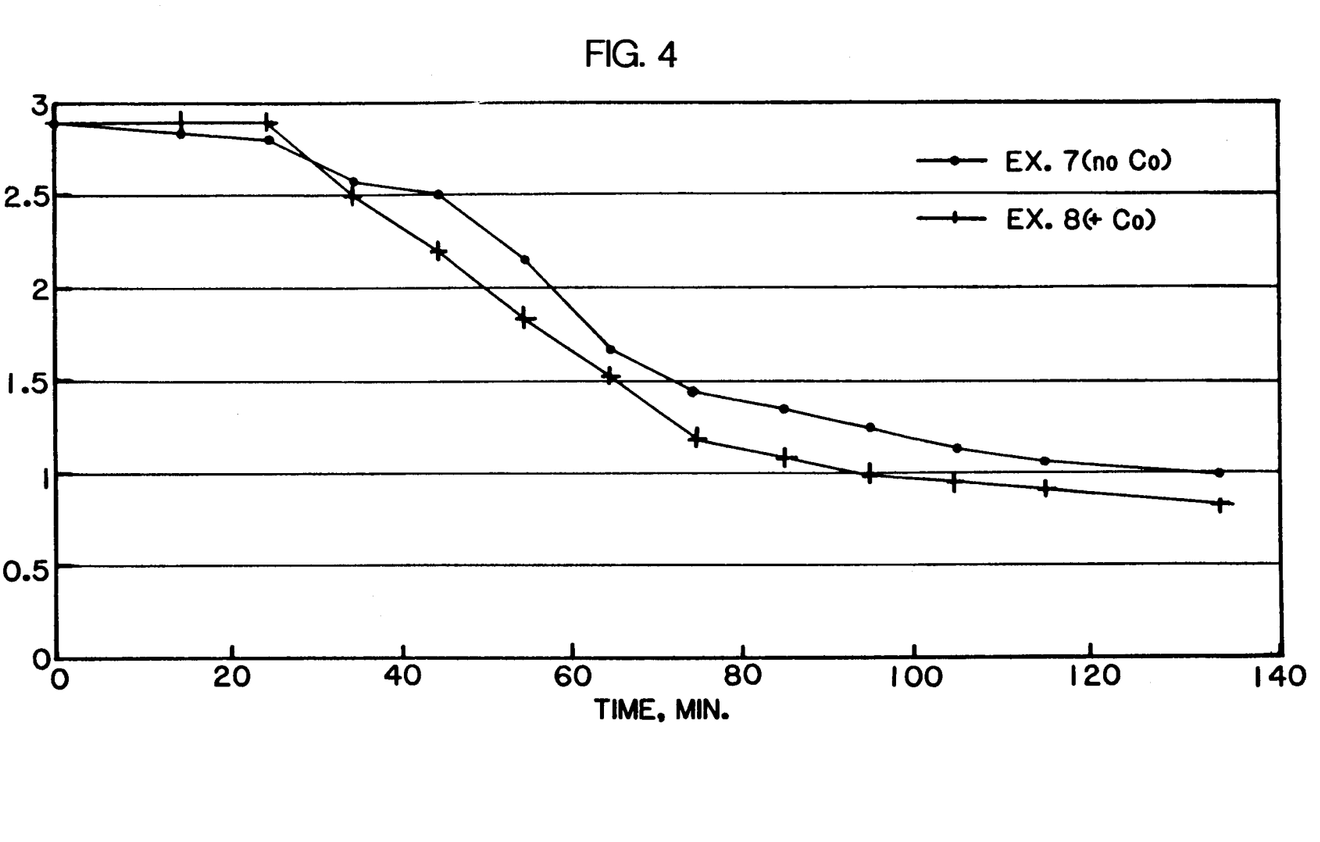
FIG. 4 is a graphical representation, similar to that of FIG. 3, illustrating the T.E. versus time of heating and mastication in the presence of air, with the masticator internal air at a higher temperature of 286° F. Initially, of an ethylene-propylene copolymer, a mixture of the copolymer and a cobalt naphthenate catalyst.

| Time of Sample (minutes) | T.E. (Copolymer) Example 7 | T.E. (Copolymer & Cobalt) Example 8 |
| --- | --- | --- |
| 0 | 2.90 | 2.90 |
| 25 | 2.81 | 2.90 |
| 35 | 2.58 | 2.50 |
| 45 | 2.51 | 2.20 |
| 55 | 2.15 | 1.83 |
| 65 | 1.67 | 1.52 |
| 75 | 1.44 | 1.18 |
| 85 | 1.34 | 1.08 |
| 95 | 1.24 | 0.98 |
| 105 | 1.06 | 0.95 |
| 115 | 0.99 | 0.91 |
| 135 | — | 0.82 |

Power imitations and mixing limit throughput. With the present invention, viscosity and therefore power requirements are lowered early and therefore more polymer can be processed per unit of time. Moreover, the overall power requirements are reduced. Thus it can be seen by comparing the power requirements of Example 7 (control) and Example 8 (using a cobalt nephthenate catalyst) that the power requirements were reduced by 16.8% by practicing the present invention.

EXAMPLES 9-12

These examples were performed in a manner similar to Example 5, with the exceptions noted in the following Table 5.

TABLE 5

| Example | 9 | 10 | 11 | 12 |
| --- | --- | --- | --- | --- |
| Metal Catalyst | None | Co[1] | None | Co[1] |
| Metal Amount, PPM | 0 | 100 | 0 | 20 |
| Air Flow, % | 30 | 30 | 45 | 45 |
| Parapol, Lbs. | 1 | 1 | 1 | 1 |
| Time for Parapol or Cat./Parapol Addition, Min | 45 | 35 | 35 | 35 |
| Time to change gears, Min. | 65 | 57 | 63 | 52 |
| Time to 1.8 T.E., Min. | 84 | 66 | 79 | 62 |
| Time to 1.4 T.E., Min. | 101 | 83 | 98 | 75 |
| Time to 1.2 T.E., Min. | 119 | 92 | 124 | 90 |

1 = Cobalt naphthenate

As will be evidenced to those skilled in the art, various modifications on this invention can be made or followed, in light of the forgoing disclosure and illustrative examples, figures, tables and discussion without departing from the spirit and scope of the disclosure, or from the scope of the invention as set forth in the following claims.

What is claimed is:

1. A process for the oxidative, shear accelerated reduction in the thickening efficiency (T.E.) of oil soluble copolymer of ethylene and at least one $C_3$ to $C_{28}$ alpha-olefin, which comprises:
    (1) mixing oil soluble copolymer of ethylene and at least one $C_3$ to $C_{28}$ alpha-olefin having a T.E. of at least about 2.7 with catalyst selected from the group consisting of oil soluble transition metal salts of organic acids, said catalyst being present in an amount of from about 1 to about 900 parts per million, based on the amount of copolymer in said admixture, when said catalyst comprises transition metal salts of organic acids other than copper salt of organic acid and in amount of from about 1 to about 25 parts per million when said catalyst comprises oil soluble copper salt of organic acid;
    (2) heating and masticating the copolymer/catalyst mixture in the presence of oxygen or an oxygen-containing gas at a temperature of from about 110° C. to 250 ° C. for a period of time of from about 2 minutes to about 6 hours in order to degrade said copolymer to a T.E. of less than about 1.0; and
    (3) recovering degraded copolymer having a T.E. of less than about 1.0.

2. The process of claim 1 wherein said copolymer is an ethylene-propylene copolymer having an ethylene content of from about 35 to about 75 wt. %, and a propylene content of from about 25 to about 65 wt. %.

3. The process of claim 2 further comprising mixing peroxide with said polymer/catalyst mixture.

4. The process of any one of claims 2 and 7 wherein said catalyst is selected from the group consisting of iron salts of organic acids, cobalt salts of organic acids, nickel salts or organic acids, vanadium salts of organic acids, manganese salts of organic acids, chromium salts of organic acids, and mixtures thereof, and wherein said catalyst is present in an amount of from about 1 to about 60 parts per million, based on the weight of said copolymer.

5. The process of claim 2 wherein said catalyst comprises copper salt of organic acid, and wherein said catalyst is present in an amount of from about 1 to about 25 parts per million based on the weight of said copolymer.

6. The process of any of claims 2 and 3 wherein said catalyst is selected from the group consisting of copper oleate, copper naphthenate, cobalt oleate, cobalt naphthenate, iron oleate, nickel naphthenate, nickel oleate, vanadium oleate, vanadium naphthenate, chromium oleate, chromium naphthenate, manganese oleate, manganese naphthenate, and mixtures thereof.

7. The process of any one of claims 2 and 3 further comprising mixing ditertiary butyl peroxide with said copolymer/catalyst.

8. The process of any one of claims 2 and 3 wherein said catalyst is selected for the group consisting of copper oleate and cobalt naphthenate.

9. The process of claim 2 wherein said catalyst is selected from the group consisting of copper oleate and cobalt naphthenate, and further comprising mixing a peroxide with said copolymer/catalyst mixture.

10. The process of claim 1 wherein said heating and mastication is carried out until the T.E. of the recovered degraded copolymer is less than about 0.75.

* * * * *